United States Patent
Boyer et al.

(12)
(10) Patent No.: US 6,519,566 B1
(45) Date of Patent: Feb. 11, 2003

(54) METHOD FOR HANDS-FREE OPERATION OF A POINTER

(75) Inventors: Linda M. Boyer, Boca Raton, FL (US); James R. Lewis, Delray Beach, FL (US); Kerry A. Ortega, Raleigh, NC (US); Ji Wee Tan, West Palm Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,694

(22) Filed: Mar. 1, 2000

(51) Int. Cl.[7] ............................................... G10L 15/22

(52) U.S. Cl. ...................................................... 704/275

(58) Field of Search ................................. 704/270, 275, 704/272

(56) References Cited

U.S. PATENT DOCUMENTS

| | | | | |
|---|---|---|---|---|
| 5,875,448 A | * | 2/1999 | Boys et al. | 707/531 |
| 5,909,667 A | * | 6/1999 | Leontiades et al. | 704/275 |
| 5,970,460 A | * | 10/1999 | Bunce et al. | 704/278 |

* cited by examiner

Primary Examiner—Richemond Dorvil
(74) Attorney, Agent, or Firm—Akerman Senterfitt

(57) ABSTRACT

The method of the invention involves a plurality of steps including, defining a set of user voice commands for hands-free control of a pointer and, in response to receiving a first audio input recognized as one of the set of user voice commands, initiating motion of the pointer in a direction indicated by the user voice command. Subsequently, in response to receiving a second audio input, the pointer motion can be discontinued. Finally, in response to receiving one or more subsequent audio inputs not recognized as being among the set of user voice commands, the pointer can be incrementally moved responsive to the subsequent audio inputs.

30 Claims, 3 Drawing Sheets

METHOD FOR HANDS-FREE OPERATION OF A POINTER

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Technical Field

This invention relates to the field of voice recognition software, and more particularly, to a method for hands-free operation of a pointer.

2. Description of the Related Art

Often, tasks which able body persons take for granted can be difficult for disabled persons. One such routine task can be manipulation of a common mouse pointing device for use with a computer system. Presently, disabled persons suffering from physical limitations still lack an acceptable solution for manipulating a mouse or other pointing device. Speech recognition technology can offer disabled persons an intuitive hands-free method of operating a computer system, navigating within one application, or even among several applications.

Speech recognition is the process by which an acoustic signal received by a microphone is converted to text by a computer. The converted text can be used in a variety of computer software applications for purposes such as document preparation, data entry, and command and control. The area of command and control is a particularly important aspect of speech recognition as it relates to the hands-free operation of computer systems by disabled users. Attempts to develop systems for hands-free navigation of software applications and operating systems have yielded systems presently known within the art. Unfortunately, present systems suffer from various disadvantages.

Voice enabled applications represent an attempt at hands-free operation of software applications. Within such systems, a user can access an object command by saying the corresponding object name. For example, to activate a command in a file, edit or view menu in a menu or toolbar, the user can say "file", "edit", or "view". Saying any one of the aforementioned words can cause the object's respective drop down menu to appear, as if the object had been "clicked on" using a mouse. In this manner, a user can operate the various features of a software application.

While voice enabled applications are useful, there are disadvantages. One disadvantage is that the voice operation of a software application can be limited to applications that support Active Accessibility® (MSAA) from Microsoft Corporation of Redmond, Wash. Because MSAA is a relatively new technology, many software applications do not support MSAA technology. Additionally, MSAA can limit the user to voice access of objects defined within MSAA rather than all objects in the software application. Consequently, the user may not have access to the full functionality of an application. Additionally, MSAA technology can limit the user to accessing only commands within an active software application in a computer system. Thus, navigating from one application to another can prove problematic.

Another current system for hands-free operation of a computer system utilizes a computer generated grid mapping the screen of a computer display. Concurrently, a coordinate system corresponding to intersections on the grid can be formed. In consequence, a user can specify to the system a coordinate identifying a location on the screen on which to position a mouse pointer. However, the coarseness of the grid restricts users in placing mouse pointers only at locations having defined coordinates. Although the user's desired location may be near a coordinate, it may not lie exactly on the coordinate. As a result, the system can increase the resolution of the grid by providing more mapped intersections on the screen in order to better target the user's desired pointer placement.

An inherent disadvantage of grid systems is that the user may have to perform several steps to move the pointer to the desired location. For example, the user must first specify a coordinate within the main grid system. Next, the user must specify a location closer to the user's desired location on a grid having an increased resolution. This process can be repeated until the user is able to specify a coordinate describing the user's desired location. Also problematic can be the case in which the resolution of the grid system is not precise enough for exact placement of the pointer. In such cases, the lack of adequate resolution prevents the user from navigating the full extent of the screen.

Another hands-free system currently known within the art makes use of voice commands for initiating pointer movement. Within such systems, voice commands initiate continuous motion of the pointer. The pointer continues to move in a given direction specified by the voice command until the user issues a "stop" command. By issuing various voice commands interspersed with stop commands, a user can move a pointer to a particular location on the screen.

Disadvantages of such voice navigation systems can include the likelihood of the pointer overshooting the user's desired location on screen. The overshooting can result from the substantial computer processing resources required by the voice navigation application. A corresponding system latency caused by the speech recognition function in the voice recognition application in recognizing a stop command can cause the pointer to overshoot the user's desired location. Moreover, such systems do not address the overshooting problem by providing the user with a method of finely adjusting the pointer motion or speed. As a result, there remains a substantial chance that the pointer will overshoot the user's desired location.

Consequently, hands-free application navigation systems known in the art have been unable to achieve the same degree of access to application functionality currently available to a user using a conventional mouse. Thus, present systems can limit a user's access to functionality. Likewise, present systems can compel the user to perform repetitive operations. Finally, to achieve hands-free operation of a software application, present systems can require the user to choose a less preferable application equipped with accessibility features. As a result, there has arisen a need for an improved method and system for hands-free operation of a mouse pointer.

SUMMARY OF THE INVENTION

The invention concerns a method and a system for hands-free control of a pointer. The method of the invention involves a plurality of steps including, defining a set of user voice commands for hands-free control of a pointer and, in response to receiving a first audio input recognized as one of the set of user voice commands, initiating motion of the pointer in a direction indicated by the user voice command.

Subsequently, in response to receiving a second audio input, the pointer motion can be discontinued. Finally, in response to receiving one or more subsequent audio inputs not recognized as being among the set of user voice commands, the pointer can be incrementally moved responsive to the subsequent audio inputs.

Notably, in one embodiment, the incremental motion can vary according to a measured volume of the subsequent audio input. Moreover, in another embodiment, an appearance of the pointer can be changed from a default appearance to a modified appearance prior to receiving the first audio input.

Significantly, each of the subsequent audio inputs can be one of an audio input recognized as being a user voice command among the set of user voice commands, and an audio input not recognized a user voice command as being among the set of user voice commands. In one embodiment of the inventive method, if one of the subsequent audio inputs is an audio input recognized as a user voice command among the set of user voice commands, the method of the invention can include moving the pointer to a location on screen where the pointer existed when the computer system first began receiving the subsequent audio input recognized as a user voice command. Additionally, the method of the invention can include executing the user voice command received in the second receiving step. In one embodiment, the method of the invention can further include detecting a pause of a predetermined duration between the subsequent audio inputs and the subsequent audio input recognized as a user voice command among the set of user voice commands.

The user voice command can include a command word, and optionally one or more parameters. In accordance with this aspect of the invention, the step of receiving a first audio input recognized by the speech recognition engine as being among the set of user voice commands can further include the steps of receiving at least one parameter associated with the user voice command; and, controlling the pointer movement according to the at least one parameter.

Notably, the pointer motion can be controlled in one or more software applications in the computer system. In addition, the pointer motion can be controlled in a software application not equipped with accessibility features. Finally, the pointer motion can be controlled in an operating system.

In a computer system having a speech recognition engine for processing audio input, a hands-free method of controlling a pointer can comprise the following steps. First, a command-mode voice command recognized as being among a predefined set of user voice commands for hands-free controlling the pointer can be accepted for moving the pointer in accordance with at least one parameter supplied with the command-mode command. Second, a transition can occur from the command-mode to an idle-mode for fine positioning the pointer. Finally, the pointer can be incrementally moved in the idle-mode in response to audio inputs not recognized as being user voice commands among the set of user voice commands, each incremental movement occurring concurrently with a corresponding audio input. In one aspect of the invention, the incremental motion can vary according to a measured volume of the audio inputs. Moreover, in an alternative aspect of the invention, an appearance of the pointer can be changed from a default appearance to a modified appearance prior to receiving the first audio input.

The transitioning step can comprise monitoring the speech recognition engine for a first audio input; and determining if the first audio input is one of a command not recognized as a user voice command included in the predefined set of user voice commands, an idle-mode command and a specific command for selecting idle mode. If the first audio input is one of a command not recognized as a user voice command included in the predefined set of user voice commands, an idle-mode command and a specific command for selecting idle mode, the pointer motion caused by said command-mode command can be discontinued. Significantly, each of the audio inputs can be one of an audio input recognized as being among the predefined set of user voice commands for controlling the pointer, and an audio input not recognized as being among the predefined set of user voice commands for controlling the pointer. In a preferred embodiment of the invention, if the first audio input is an audio input recognized as being among the predefined set of user voice commands for controlling the pointer, the pointer can be moved to a location on screen where the pointer existed when the user voice command was first received. Subsequently, the user voice command received in the transitioning step can be executed.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

A system for hands free control of a pointer can enable a user to control the movement of a pointer via spoken utterances. In the preferred embodiment, the pointer can be a mouse pointer. When activated, the system can move the mouse pointer responsive to spoken commands processed in a speech recognition application. Specifically, responsive to an audio input recognized by the system as a user voice command, the system can initialize the motion of the mouse pointer in a user-specified direction. The motion can be discontinued in response to a subsequent audio input, regardless of whether the subsequent audio input is recognized by the system as a user voice command. Advantageously, the audio input can be recognized as a user voice command for invoking a fine adjust mode. In the fine adjust mode, the system can incrementally move the mouse pointer responsive to successive audio inputs not recognized as a user command. Hence, as an example, a user can perform a hands-free movement of a mouse pointer towards the top of a display screen by uttering the user voice command "move up" followed by the repeated audio input "keep going", where "keep going" is not recognized by the system as a user voice command.

Figure 1:
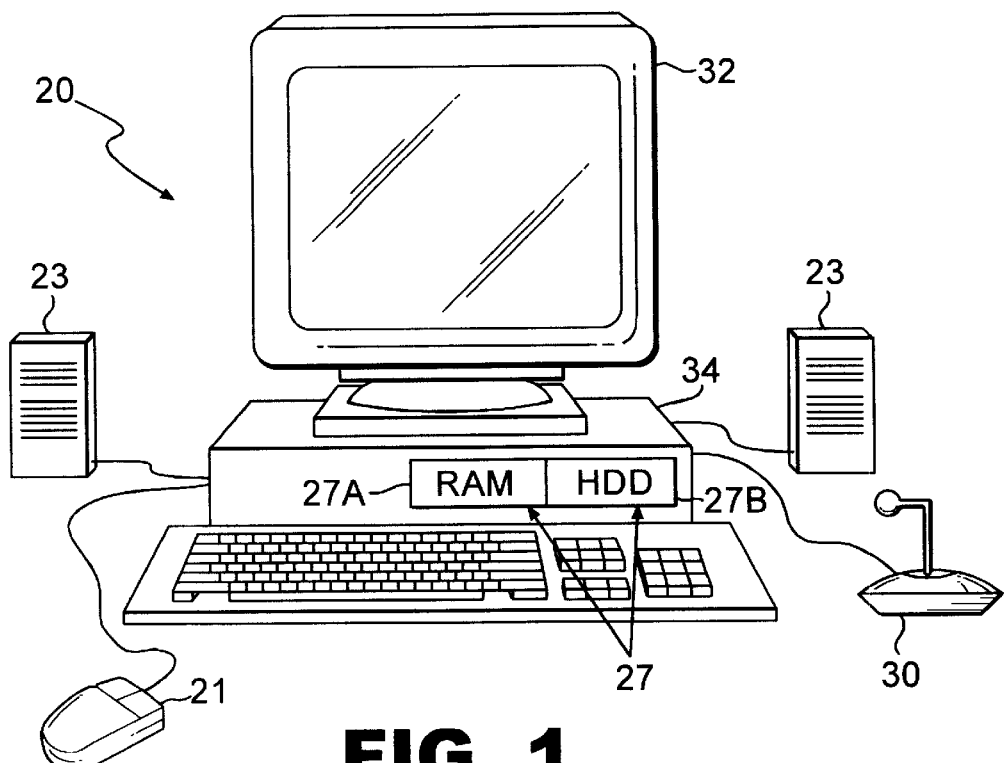
FIG. 1 is a block diagram which illustrates a computer system for speech recognition.

FIG. 1 shows a typical computer system 20 for use in conjunction with a system for hands-free control of a pointer. The computer system 20 is preferably comprised of a computer 34 including a central processing unit (CPU), one or more memory devices and associated circuitry. The computer system 20 includes computer memory devices 27, which is preferably comprised of an electronic random access memory 27A and a bulk data storage medium 27B, such as a magnetic disk drive. Specifically, the system also includes a microphone 30 operatively connected to the computer system through suitable interface circuitry or a "sound board" (not shown), and preferably at least one user interface display unit 32 such as a video data terminal (VDT) operatively connected thereto. The CPU can be comprised of any suitable microprocessor or other electronic processing unit, as is well known to those skilled in the art. An example of such a CPU would include the Pentium or Pentium II brand microprocessor available from Intel Corporation or any similar microprocessor. Speakers 23, as well as an interface device, such as mouse 21, may be provided with the system, but are not necessary for operation of the invention as described herein. The various hardware requirements for the computer system as described herein can generally be satisfied by any one of many commercially available high speed multimedia personal computers offered by manufacturers such as International Business Machines Corporation of Armonk, N.Y. Alternatively, the hardware requirements can exist as an embedded system functioning as a component in a more complex system such as an automobile.

Figure 2:
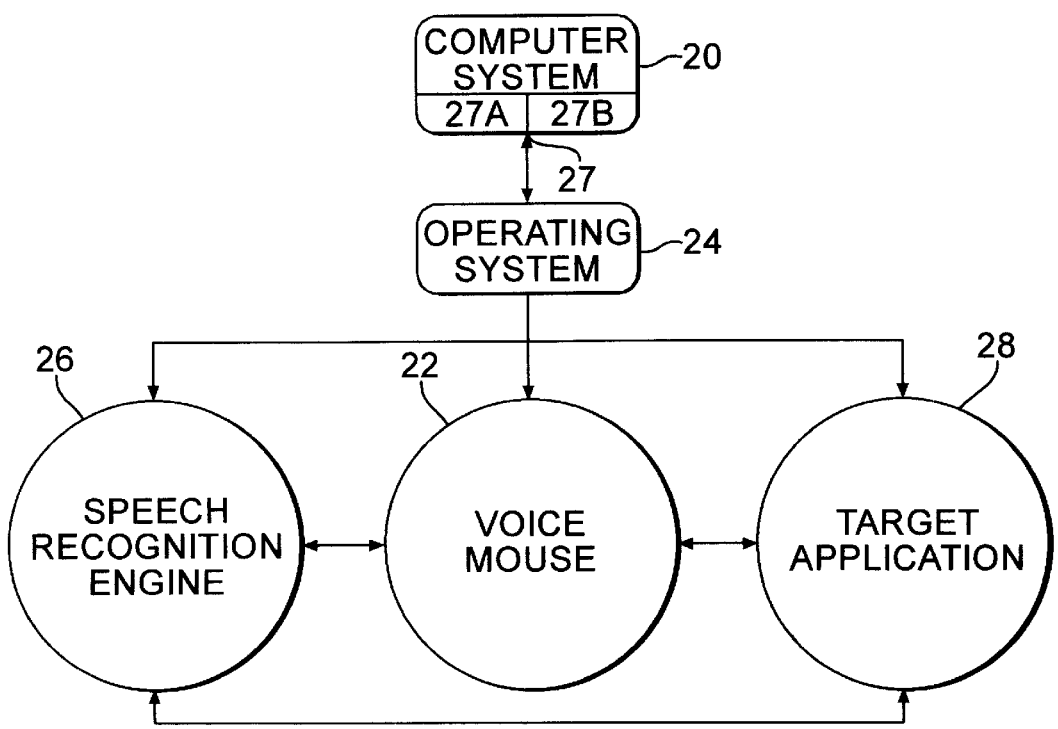
FIG. 2 is a block diagram showing a typical high level architecture for the computer system in FIG. 1.

FIG. 2 illustrates a typical architecture for a system for hands-free control of a pointer in computer 20. As shown in FIG. 2, the architecture preferably includes an operating system 24, a speech recognition engine application 26 and the system for hands-free control of a pointer, referred to hereinafter as "voice mouse" 22. In the example shown, a target application 28 is also provided. However the invention is not limited in this regard. Rather, the voice mouse 22 can be used with multiple target applications. Moreover, voice mouse 22 can be used with the operating system 24 alone. Notably, each of the operating system 24, voice mouse 22, speech recognition application 26 and the target application 28 can be stored in fixed storage 27B and loaded for execution in random access memory 27A.

In FIG. 2, the speech recognition engine 26, target application 28, the operating system 24, and the voice mouse 22 are shown as separate application programs. It should be noted however that the invention is not limited in this regard, and these various application programs could be implemented as a single, more complex applications program. For example, the speech recognition application 26 could be combined with the target application 28 or with any other application to be used in conjunction with the speech recognition application 26.

In a preferred embodiment which shall be discussed herein, operating system 24 is one of the Windows family of operating systems, such as Windows NT, Windows 95 or Windows 98 which are available from Microsoft Corporation of Redmond, Wash. However, the system is not limited in this regard, and the invention can also be used with any other type of computer operating system. The system as disclosed herein can be implemented by a programmer, using commercially available development tools for the operating systems described above.

Figure 3A:
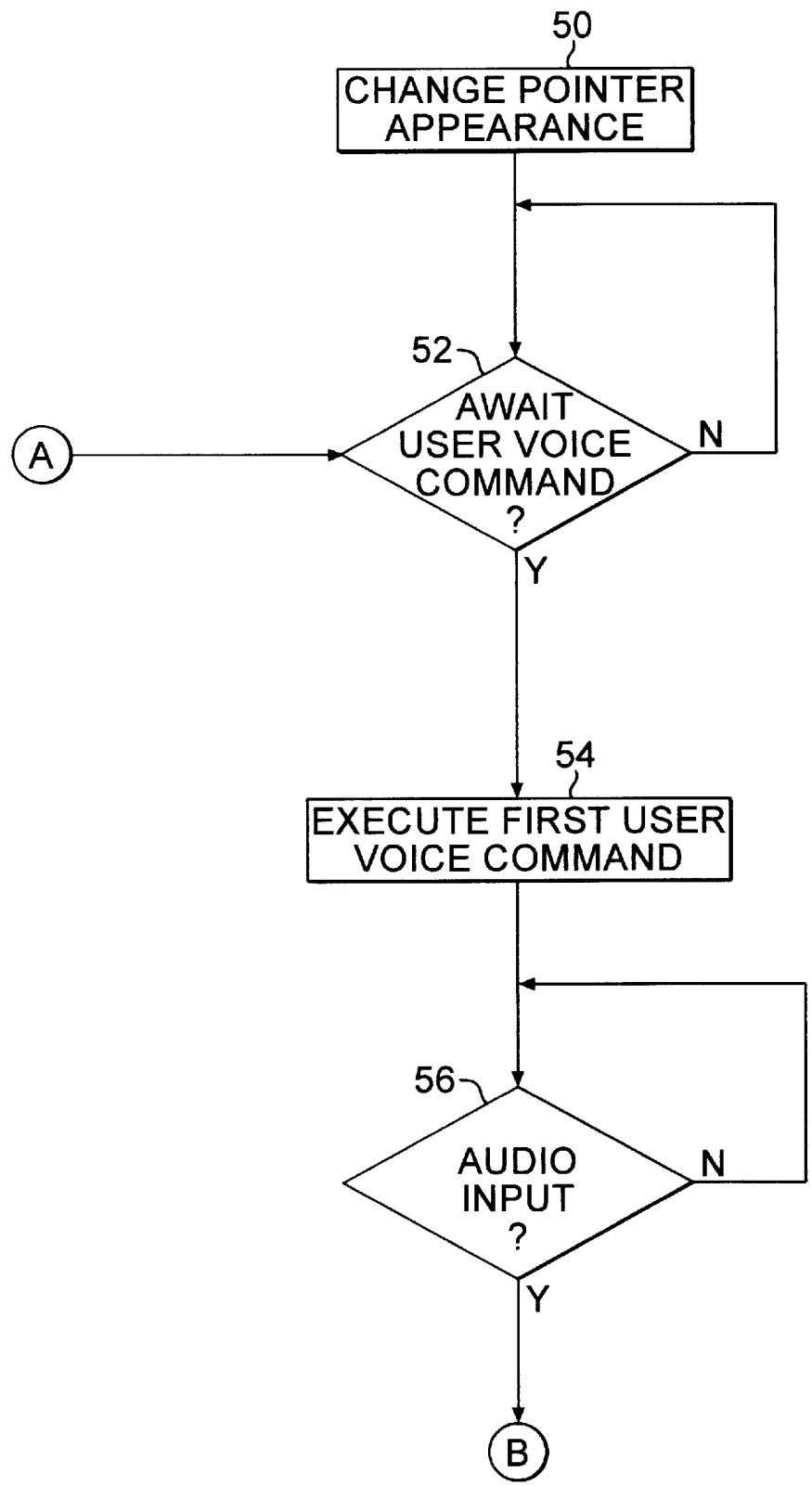
FIGS. 3A and 3B, taken together, are a flow chart illustrating a method for hands-free control of a pointer in a computer system.
Figure 3B:
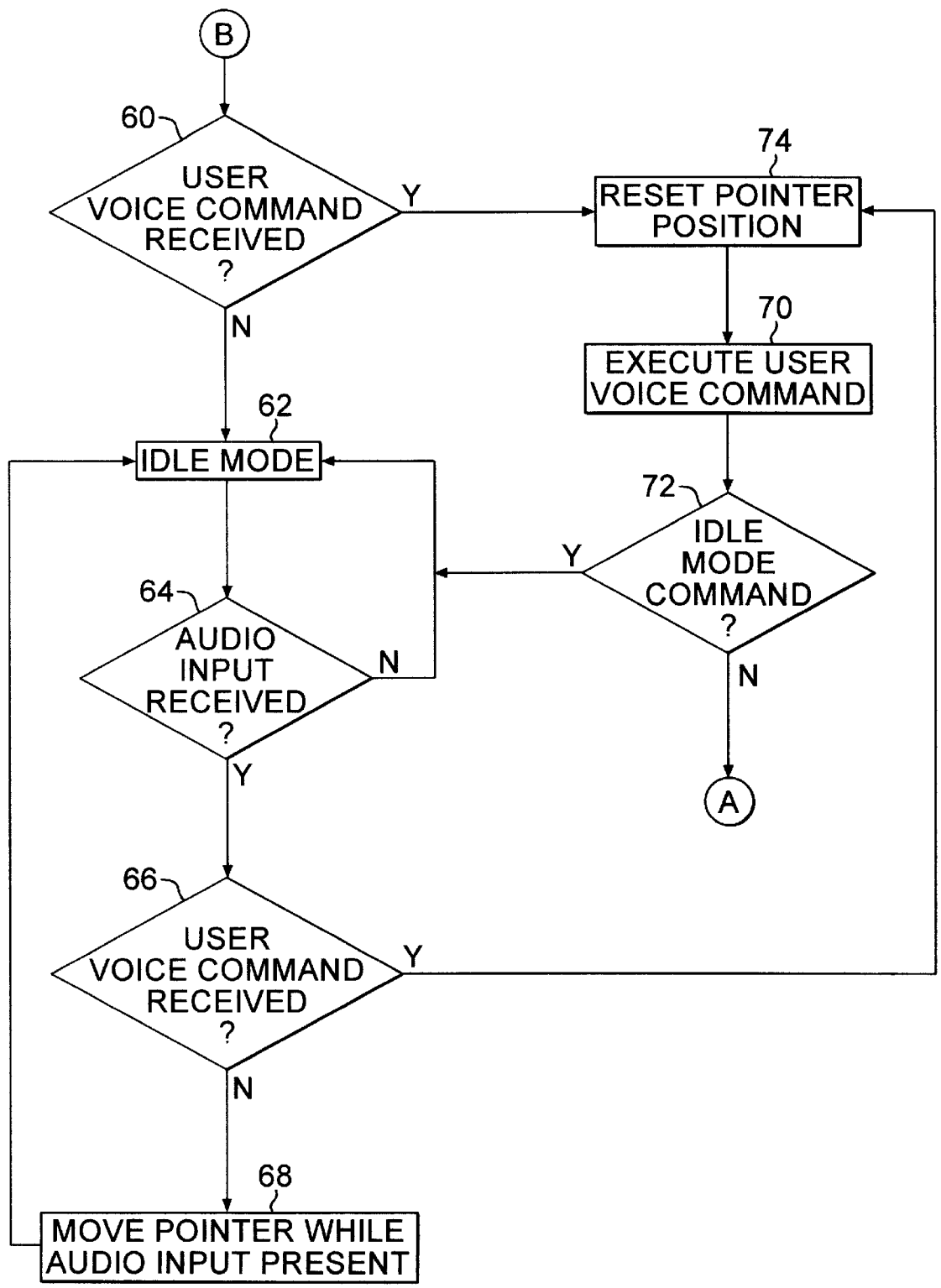

FIGS. 3A and 3B taken together are a flow chart illustrating a hands-free method of controlling the voice mouse 22 in computer system 20. Beginning with FIG. 3A in step 50, after the voice mouse 22 is activated, the voice mouse 22 can optionally alter the appearance of the on-screen pointer, which is otherwise controlled by a conventional mouse. Altering the appearance of the pointer indicates to the user that the voice mouse 22 has been activated successfully, and is ready for use.

In step 52, the voice mouse 22 awaits a first audio input recognized as a user voice command. In particular, the speech recognition engine 26, in combination with audio circuitry (not shown) can convert the audio input into recognized text using speech recognition techniques well-known in the art. Subsequently, the speech recognition engine 26 in combination with the voice mouse 22 can determine if the audio input is a user voice command. A user voice command can be a series of spoken utterances from the user received by the voice mouse as an audio input and recognized as having a predefined command word, and optionally, one or more predefined parameter words.

An example of a user voice command can be "MOVE <direction> <distance>". As is evident in the example, here, the user voice command includes the command word "MOVE" and command parameters "<direction>" and "<distance>". In response to the user uttering a user voice command, the voice mouse 22, in conjunction with the speech recognition engine 26, can identify the command word, and based on the command word recognized, further identify any parameter words included in the command syntax.

Taking the previous command as an illustration, if the user utters "MOVE UP THREE UNITS", the voice mouse 22, in conjunction with the speech recognition engine 26, can recognize the text "MOVE" as a command word. Additionally, the voice mouse 22, in conjunction with the speech recognition engine 26, can parse the remaining recognized text to extract the parameters "UP", indicating the direction the user wishes the pointer to move, and a distance "THREE UNITS". The distance can be expressed as any unit of measurement suited to measuring distances on a computer monitor. For example, distance can be expressed in centimeters, millimeters, pixels, or inches. The voice mouse 22 can default to a preset unit absent user adjustment of the option. Notably, the above-mentioned user voice command is illustrative of a non-continuous movement user voice command.

Another example of a user voice command can be "<direction>". In this case, the user voice command consists of only a parameter value which functions as the command word. Thus, the voice mouse 22, in conjunction with the speech recognition engine 26, can recognize that the user is commanding the voice mouse 22 to move the pointer in the recognized direction uttered by the user. For example, use of such a command can move the pointer a predetermined number of pixels in the direction specified by the user.

Yet another example of a user voice command can be the continuous "MOVE <direction> <speed>". Similar to the above-identified non-continuous movement "MOVE" commands, the continuous movement "MOVE <direction> <speed>" command causes the pointer to move in the direction and speed indicated by the direction and speed parameters. Speed can be expressed in relative terms, for example "fast" or "slow". Similar to the distance parameter, the voice mouse 22 can default to a preset relative speed absent user adjustment of the option.

Unlike the non-continuous movement "MOVE" command, although the continuous movement "MOVE <direction> <speed>" command initiates movement of the pointer, it does not contain information indicative of a stopping point. As a result, the "MOVE <direction> <speed>" command is illustrative of a continuous movement user voice command. Such a command causes the pointer to move in the direction and speed indicated until another event causes the motion to stop. Such an event can be another user voice command, an audio input, or the pointer reaching the video screen boundary.

It further should be appreciated by those skilled in the art that in addition to having continuous movement or non-continuous movement attributes, user voice commands can possess further attributes. For example, some user voice commands put the voice mouse 22 into a command mode, in which the voice mouse, subsequent to the execution of the user voice command, can await a subsequent user voice command. Other user voice commands or any audio not recognized by the voice mouse 22 as a voice command can put the voice mouse 22 in idle mode. In idle mode, the voice mouse 22, subsequent to the execution of the user voice command, can be responsive to any audio input, regardless of whether the audio input is recognized as a user voice command.

Continuing with FIG. 3A, until the voice mouse 22 receives a user voice command, the voice mouse 22 enters a perpetual loop. Once a valid user voice command is received by the voice mouse 22 in step 52, the voice mouse 22 proceeds to step 54. In step 54, the voice mouse 22 begins execution of the user voice command. For example, in the case where the user voice command is a non-continuous movement command, the voice mouse 22 can begin to move the pointer in the direction and manner specified by the user voice command. In the case of a continuous movement command, the voice mouse 22 also initiates movement of the pointer in the direction and manner specified by the user voice command.

Proceeding to step 56, the voice mouse 22 monitors for any audio input received by the speech recognition engine 26. If audio input is received by the speech recognition engine 26, regardless of whether the user voice command was of the continuous movement or non-continuous movement type, the voice mouse 22 proceeds to jump circle B. Continuing from jump circle B to step 60 in FIG. 4B, the voice mouse 22 determines whether the audio input received is recognized by the speech recognition engine 26 in conjunction with the voice mouse 22 as a second user voice command rather than mere user utterances not recognizable as a user voice command. If the audio input received is recognized by the speech recognition engine 26 in conjunction with the voice mouse 22 as a second user voice command, the voice mouse 22 continues to step 74. Otherwise, the voice mouse 22 continues to step 62. In step 74, the pointer position can be reset to the position on the display screen where the pointer existed when the voice mouse 22 first began receiving the audio input. In step 70, the voice mouse 22 can execute the recognized second user voice command. For example, the second user voice command may be a "STOP" command intended to stop the movement of the pointer. In this case the voice mouse 22 can execute the recognized second user voice command by discontinuing the motion of the pointer, whether the initial user command was a continuous or a non-continuous movement command.

After execution of the recognized second user voice command, the voice mouse 22 continues to step 72. In step 72, the voice mouse 22 determines whether the recognized second user voice command is an idle mode command rather than a command mode command. In idle mode, the voice mouse 22, subsequent to the execution of a user voice command, can respond to any audio input, regardless of whether the audio input is recognized as a user voice command. Advantageously, in the present invention, when in idle mode, the voice mouse 22 can incrementally move in response to the sound of the user's voice. Specifically, the incremental movement can continue concurrently with audio input provided by the user until the speech recognition engine 26, in conjunction with the voice mouse 22, recognizes the audio input as a user voice command.

Thus, returning to FIG. 4B, if the second user voice command is an idle mode command, the voice mouse 22 remains in the idle mode and the voice mouse 22 continues to step 62. Otherwise, the voice mouse 22 continues to jump circle A to repeat the process. For example, the STOP command is not an idle mode command, but a command mode command. Thus, if the voice mouse 22 receives a STOP command in step 60, the voice mouse 22 proceeds to jump circle A to start the process anew.

In contrast, the "MOVE BACK" command is an idle mode command. Thus, as yet another example, if the voice mouse 22 receives the MOVE BACK command as the recognized second user voice command, the voice mouse 22 can set the motion of the pointer to the opposite direction of the first user voice command. Such a command can be useful when the user inadvertently overshoots a desired screen location. However, subsequent to the execution of the MOVE BACK command, the voice mouse 22, having determined that the MOVE BACK command is an idle mode command in step 72, can proceed to step 62. In step 62 the voice mouse 22 can enter the idle mode.

The voice mouse 22 can enter idle mode in one of several ways. As illustrated above, the voice mouse 22 can be placed in idle mode as a result of an idle mode user voice command, for example MOVE BACK. Also, it should be appreciated that the voice mouse 22 can be placed in idle mode upon reception of a specific user voice command intended only to place the voice mouse 22 into the idle mode. The "FINE ADJUST" user voice command is an example of a specific user voice command intended only to place the voice mouse 22 into the idle mode. Thus, when the voice mouse 22 receives the user voice command FINE ADJUST, the voice mouse 22 can be placed in idle mode. Finally, the voice mouse 22 can be placed in the idle mode, when, during the execution of a user voice command, the voice mouse 22 receives any audio input not recognized by the speech recognition engine 26 in conjunction with the voice mouse 22 as a user voice command. For instance, if a continuous movement user voice command is received in step 52, for example MOVE <direction > <speed >, and the user subsequently utters any sound not recognized by the speech recognition engine 26 in conjunction with the voice mouse 22 as a user voice command, then the voice mouse 22 can enter the idle mode in step 62.

In step 62, the voice mouse 22 awaits subsequent audio input from the user. If no audio input is received, then the voice mouse 22 continually loops. If audio input is received, then the voice mouse 22 proceeds to step 66. In step 66 the voice mouse 22 determines whether the audio input is a user voice command. If the audio input is determined to be a user voice command, the voice mouse 22 proceeds to step 74. Otherwise, the voice mouse 22 proceeds to step 68.

In step 68, the voice mouse 22 moves the pointer in the direction dictated by the last user voice command. For example, if a continuous movement user voice command was received in step 52 and the user subsequently uttered a sound not recognized as a user voice command, then the voice mouse 22 enters idle mode. Upon receiving any other audio input not recognized by the speech recognition engine 26 in conjunction with the voice mouse 22 as a user voice command, the voice mouse 22 can incrementally move the pointer concurrently with receiving audio input not recognized by the speech recognition engine 26 in conjunction with the voice mouse 22 as a user voice command.

In this manner, the user can initiate movement by uttering the continuous movement user voice command "MOVE UP SLOW". Upon receiving as audio input any sound from the user that the by the speech recognition engine 26 in conjunction with the voice mouse 22 does not recognize as a user voice command, the voice mouse 22 enters the idle mode and stops the pointer motion. Any further sounds from the user not recognized by the speech recognition engine 26 in conjunction with the voice mouse 22 as a user voice command can initiate movement again in the "up" direction. For example, after saying "MOVE UP SLOW", the user can say "OK, keep going, keep going, keep going". Responsively, the voice mouse 22 can begin moving the pointer up slowly, subsequently stopping as the voice mouse 22 enters idle mode upon detecting the audio input "OK", which is not a user voice command. Upon receiving the audio input "keep going" the voice mouse 22 can initiate movement of the pointer in the "up" direction. The voice mouse 22 can keep moving the pointer incrementally and continuously while audio input is detected by the voice mouse 22 in conjunction with the speech recognition engine 26. As a result, advantageously, the user can finely adjust the pointer movement. It should be appreciated by those skilled in the art that the stopping of the pointer upon receiving the audio input and subsequent restarting can be extremely fast and virtually unnoticeable to the user. Such is the case where the user utters a phrase. Further, the re-initiated motion of the pointer can be in the direction indicated by the last user voice command having a direction parameter received by the voice mouse 22.

After completion of step 68, when no audio input is detected by the voice mouse 22, the voice mouse 22 continues to step 62. By looping through steps 62 through 68, the user utterances need not be continuous. For example, the user can say "more, keep going". Upon stopping, the voice mouse 22 loops back to step 62. If the user says "a little more", the voice mouse 22 continues through step 68.

Ultimately, the voice mouse 22 can exit the idle mode. Specifically, in the case where the voice mouse 22 receives an audio input recognized by the speech recognition engine 26 in conjunction with the voice mouse 22 as a user voice command in step 66, the voice mouse 22 can exit the idle mode by proceeding to step 70. A user typically can exit the idle mode when, for example, having utilized the idle mode to move the pointer towards a desired location, the pointer has reached its desired location on the screen. In consequence, the user may want to issue a non-idle mode user voice command such as "DOUBLE CLICK" in order to initiate a function.

Notably, in this situation, the voice mouse 22 can return the pointer to a location on screen at which the pointer existed at the time the user voice command was first articulated by the user. Thus, the user can transition from the idle mode into a command mode without overshooting the desired location on the screen. For example, the user, subsequent to having placed the voice mouse 22 in the idle mode, may say "keep going, keep going, going, DOUBLE CLICK". In this case, the pointer moves continuously and incrementally while the voice mouse 22 detects the audio input "keep going, keep going, going". Notably, such words are not recognized as user voice commands. Further, any pauses in the user utterance cause the voice mouse 22 to loop through steps 62 through 68. However, upon recognition of the valid user voice command DOUBLE CLICK, the voice mouse 22 recalls the exact location of the pointer when the voice mouse 22 first began to detect the audio input DOUBLE CLICK. The voice mouse 22 then places the pointer at the previous location prior to executing the newly recognized user voice command DOUBLE CLICK.

It should be appreciated by those skilled in the art that a pause of a predetermined duration may be necessary between audio input not recognized as a user voice command and a user voice command. This pause may be necessary for accurate parsing of audio received by the voice mouse 22. For example, the voice mouse 22 can require a pause of 0.4 milliseconds between a user voice command and audio not recognized as a user voice command. The invention is not so limited by the exact duration of the pause specified, and it should be appreciated that the pause can preferably be adjusted as a setting within the invention.

One advantage of moving the pointer in response to audio input not recognized by the speech recognition engine 26 in conjunction with the voice mouse 22 as a user voice command, is that the voice mouse 22 response is greatly improved leading to less pointer overshoot and system latency. Such benefits arise because voice recognition, which requires significant system resources, need not be performed on every portion of audio received by the voice mouse 22. Notably, the incremental and continuous movement of the pointer while the voice mouse 22 is in idle mode preferably is responsive to the volume of the audio received through associated audio circuitry by the voice mouse 22 in conjunction with the speech recognition engine 26. For example, in response to an audio input in idle mode, the voice mouse 22 can increase the speed and acceleration of the pointer in response to audio input having a loud or increasing volume. Similarly, the voice mouse 22 can decrease the pointer speed and acceleration in response to audio input received in idle mode having a low or decreasing volume. In this manner, the pointer can be controlled in a similar fashion to a manually controlled conventional mouse. For example, the user can say "keep going, keep going, keep going" with increasing volume on each repetition of the phrase "keep going". In this case, the voice mouse 22 can cause the pointer to move faster, where increases in pointer speed can correspond to increases in audio input volume. Also, abrupt changes in volume can cause abrupt changes in pointer acceleration and speed. Finally, the pointer can be operated in similar fashion according to changing tones in the audio input.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

What is claimed is:

1. In a computer system having a speech recognition engine for processing audio input, a hands-free method of controlling a pointer comprising:

defining a set of user voice commands for hands-free control of said pointer;

in response to receiving a first audio input recognized as a user voice command included in said defined set of user voice commands, initiating motion of said pointer in a direction indicated by said user voice command;

in response to receiving a second audio input, discontinuing said pointer motion; and, in response to receiving one or more subsequent audio inputs not recognized as being user voice commands included in said defined set of user voice commands, incrementally moving said pointer responsive to said subsequent audio inputs until an audio input recognized as being a user voice command is received.

2. The method according to claim 1, further comprising changing an appearance of said pointer from a default appearance to a modified appearance prior to receiving said first audio input.

3. The method according to claim 1, wherein each of said subsequent audio inputs is one of an audio input recognized as a user voice command included in said defined set of user voice commands, and an audio input not recognized as being included in said defined set of user voice commands.

4. The method according to claim 3, further comprising:
if one of said subsequent audio inputs is an audio input recognized as a user voice command included in said defined set of user voice commands, moving said pointer to a location on screen where said pointer existed when said subsequent audio input recognized as a user voice command was first received.

5. The method according to claim 4, further comprising executing said user voice command received in said second receiving step.

6. The method according to claim 4, further comprising the step of detecting a pause of a predetermined duration between said subsequent audio inputs not recognized as a user voice command and said subsequent audio input recognized as a user voice command.

7. The method according to claim 1, wherein said incremental motion varies according to a measured volume of said subsequent audio input.

8. The method according to claim 1, wherein said first receiving step further comprises:
receiving at least one parameter associated with said user voice command; and,
controlling said pointer movement according to said at least one parameter.

9. The method according to claim 1, wherein said pointer motion is controlled in one or more software in said computer system.

10. The method according to claim 1, wherein said pointer motion is controlled in a software application not equipped with accessibility features.

11. The method according to claim 1, wherein said pointer motion is controlled in an operating system.

12. In a computer system having a speech recognition engine for processing audio input, a hands-free method of controlling a pointer comprising:
accepting a command-mode voice command recognized as being among a predefined set of user voice commands for controlling said pointer;
in response to an audio input, transitioning from said command-mode to an idle-mode for fine positioning said pointer; and,
incrementally moving said pointer in said idle-mode in response to audio inputs not recognized as being among said predefined set of user voice commands for controlling said pointer, each incremental movement occurring concurrently with a corresponding audio input.

13. The method according to claim 12, wherein said transitioning step comprises:
monitoring said speech recognition engine for said audio input;
determining if said audio input is one of a command not recognized as a user voice command included in said predefined set of user voice commands, an idlemode command and a specific command for selecting idle-mode; and,
if said audio input is one of a command not recognized as a user voice command included in said predefined set of user voice commands, an idle-mode command and a specific command for selecting idle mode, discontinuing pointer motion caused by said command-mode command.

14. The method according to claim 13, wherein said audio input is one of an audio input recognized as being among said predefined set of user voice commands for controlling said pointer, and an audio input not recognized as being among said predefined set of user voice commands for controlling said pointer.

15. The method according to claim 14, further comprising:
if said audio input is recognized as a user voice command included in said set of user voice commands for controlling said pointer, moving said pointer to a location on screen where said pointer existed when said user voice command was first received.

16. The method according to claim 15, further comprising the step of executing said user voice command received in said transitioning step.

17. The method according to claim 12, further comprising the step of changing an appearance of said pointer from a default appearance to a modified appearance prior to receiving said first audio input.

18. The method according to claim 12, wherein each of said audio inputs is one of an audio input recognized as being among said predefined set of user voice commands for controlling said pointer, and an audio input not recognized as being among said predefined set of user voice commands for controlling said pointer.

19. The method according to claim 12, wherein said incremental motion varies according to a measured volume of said audio inputs.

20. A machine readable storage, having stored thereon a computer program having a plurality of code sections executable by a machine for causing the machine to perform the steps of:
defining a set of user voice commands for hands-free control of a pointer;
in response to receiving a first audio input recognized as a user voice command included in said defined set of user voice commands, initiating motion of said pointer in a direction indicated by said user voice command;
in response to receiving a second audio input, discontinuing said pointer motion; and,
in response to receiving one or more subsequent audio inputs not recognized as being user voice commands included in said defined set of user voice commands, incrementally moving said pointer responsive to said subsequent audio inputs until an audio input recognized as being a user voice command is received.

21. The machine readable storage according to claim 20, further comprising changing an appearance of said pointer from a default appearance to a modified appearance prior to receiving said first audio input.

22. The machine readable storage according to claim 20, wherein each of said subsequent audio inputs is one of an audio input recognized as a user voice command included in said defined set of user voice commands, and an audio input not recognized as being a user voice command included in said defined set of user voice commands.

23. The machine readable storage according to claim 22, further comprising:
if one of said subsequent audio inputs is an audio input recognized as a user voice command included in said defined set of user voice commands, moving said pointer to a location on screen where said pointer existed when said subsequent audio input recognized as a user voice command was first received.

24. The machine readable storage according to claim 23, further comprising executing said user voice command received in said second receiving step.

25. The machine readable storage according to claim 23, further comprising detecting a pause of a predetermined duration between said subsequent audio inputs not recognized as a user voice command and said subsequent audio input recognized as a user voice command.

26. The machine readable storage according to claim 20, wherein said incremental motion varies according to a measured volume of said subsequent audio input.

27. The machine readable storage according to claim 20, wherein said step of receiving a first audio input recognized as a user voice command further comprises:

receiving at least one parameter associated with said user voice command; and, controlling said pointer movement according to said at least one parameter.

28. The machine readable storage according to claim 20, wherein said pointer motion is controlled in one or more software in said computer system.

29. The machine readable storage according to claim 20, wherein said pointer motion is controlled in a software application not equipped with accessibility features.

30. The machine readable storage according to claim 20, wherein said pointer motion is controlled in an operating system.

* * * * *